Sept. 20, 1949.  A. L. SPONG  2,482,563
ICING AND GLAZING MACHINE FOR BAKERY PRODUCTS
Filed May 28, 1945  2 Sheets-Sheet 2
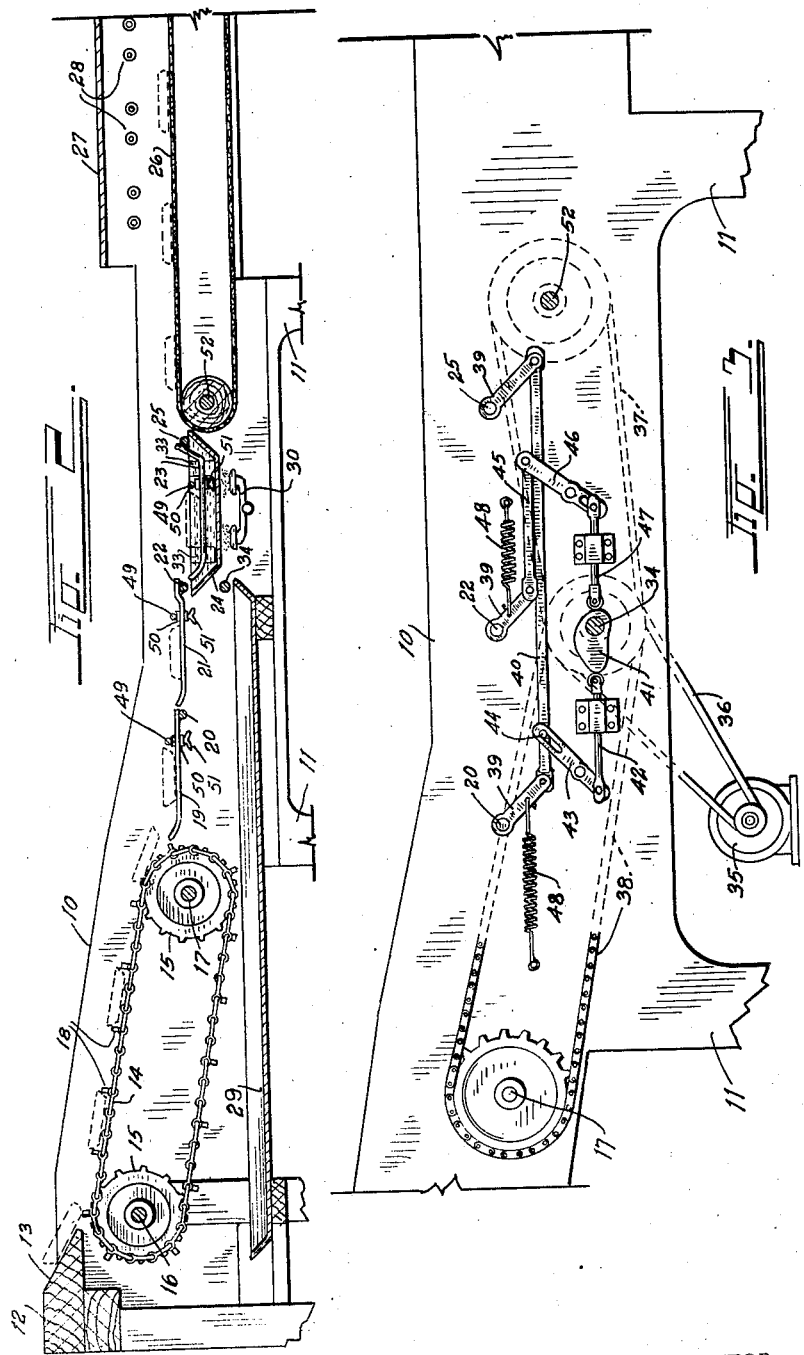
INVENTOR.
ALLEN L. SPONG.
BY
ATTORNEY.

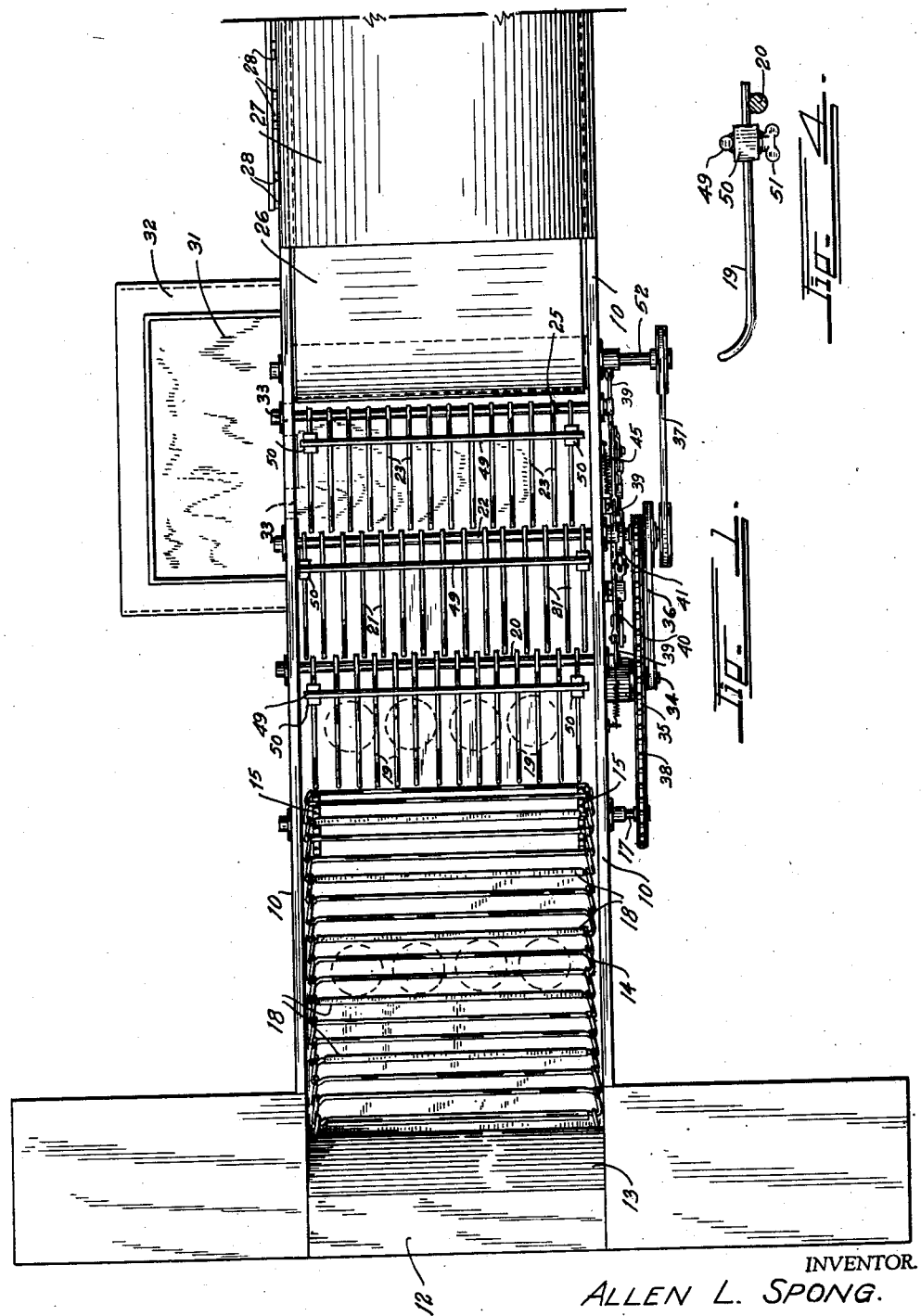

Patented Sept. 20, 1949

2,482,563

UNITED STATES PATENT OFFICE 2,482,563

ICING AND GLAZING MACHINE FOR BAKERY PRODUCTS

Allen L. Spong, Denver, Colo.

Application May 28, 1945, Serial No. 596,259

4 Claims. (Cl. 91—2)

1

This invention relates to a machine for icing or glazing bakery goods such as rolls, coffee cakes, and the like. The principal object of the invention is to provide a machine of this character which will be entirely automatic in its operation so that manual labor will be reduced to a minimum and in which all of the products will be iced or glazed uniformly.

Other objects and advantages reside in the detail construction of the invention, which is designed for simplicity, economy, and efficiency. These will become more apparent from the following description.

In the following detailed description of the invention, reference is had to the accompanying drawings which forms a part hereof. Like numerals refer to like parts in all views of the drawing and throughout the description.

In the drawings:

Fig. 1 is a plan view of the improved icing and glazing machine;

Fig. 2 is a longitudinal section on the center line through the mid-portion of said machine;

Fig. 3 is an enlarged side view of the mid-portion of the machine illustrating the drive mechanism thereof; and Fig. 4 is a detail view illustrating the construction of a flipper bar employed in the machine.

The improved icing and glazing machine is supported in an elongated frame-work employing two side boards 10 supported on a supporting structure such as suitable legs 11.

A dumping bench 12 extends across the feed extremity of the machine between the side boards 10. An inclined chute 13 extends inwardly from the dumping bench and terminates over an endless conveyor chain 14 preferably of the open bar type.

The conveyor chain 14 is trained over sprockets 15 mounted on a sprocket shaft 16 at one extremity and a drive shaft 17 at the other extremity, both extending between said side boards 10. A plurality of vertical partition members 18 extend upwardly from the chain 14 at spaced-apart intervals.

In use, the baking pans containing the cakes or rolls are placed on their edges on the dump benches 12 and are inverted so as to dump the cakes upside down onto the conveyor 14 between the partition members 18 thereon as indicated in broken line in Fig. 1. The conveyor conveys the cakes forwardly and deposits them, still in the inverted position, on a first set of flipper bars 19 extending from a flipper shaft 20. The flipper bars 19 form a plurality of rake-like, upwardly-

2 turned, tines extending in fixed parallel relation from the shaft 20.

The shaft 20 is arranged to be rotated 180° so as to lift and deposit the cakes in upright position on a second set of flipper bars 21 extending from a second flipper shaft 22. The flipper bars 21 are similar to the bars 19 and are arranged so that when the shaft 22 is rotated 180° the cakes, which are now right side up, will be again lifted and inverted to the upside down position on a third set of flipper bars 23.

The flipper bars 23 are emersed below the surface of an icing or glazing solution contained in an icing pan 24. The flipper bars 23 extend from a third flipper shaft 25 which rotates 180° and flips the upside down, and now iced, cakes onto an endless belt conveyor 26.

The conveyor 26 is mounted on suitable rollers supported by roller shafts 52. The cakes are carried by the conveyor 26 through a chilling and drying tunnel 27 provided with refrigerated coils 28 which cool and harden the icing on the cakes. A crumb pan 29 is positioned to catch crumbs and pieces falling through the bar conveyor 14 and the flipper bars 19 and 21. Burners 30 may be provided below the icing pan to maintain the icing or glazing in a fluid condition. An icing reservoir 31 is provided at one side of the machine surrounded by a warm water jacket 32 in which a supply of icing is maintained in fluid condition. As the icing is used from the pan 24, fresh icing flows thereto through ports 33 from the icing reservoir.

All of the elements of the machine are operated from a power shaft 34 positioned below the side boards 10 and driven from a suitable motor 35 through the medium of a drive belt 36, or in any other desired manner. The conveyor 26 is driven from the power shaft 34 by means of a suitable belt or chain 37 and the conveyor 14 is driven from the power shaft 34 by means of a chain or belt 38. Each of the flipper shafts 20, 22 and 25 terminates in an operating lever 39.

The levers 39 on the flipper shafts 20 and 25 are connected together by means of a connecting rod 40 so that they will move in unison. The connecting rod may be reciprocated in any desired manner. As illustrated, it is reciprocated from a cam 41 on the power shaft 34. The cam acts against a cam follower 42 to swing a rocking lever 43 which in turn acts against a lever pin 44 on the rod 40 to impart the motions of the cam 41 to the rod 40.

The flipper bars 21 are reciprocated by connecting the lever 39 of the shaft 22 through a connecting rod 45 with a second rocking lever 46. The latter is reciprocated by means of a cam follower 47 positioned on the opposite side of the cam 41 from the follower 42. The cam followers 42 and 47 are held in contact with the cam 41 by means of return springs 48.

The cam 41 is very abrupt so that the swinging movement of the flippers will require but a fraction of the arc of rotation of the power shaft 34. The power transmission to the drive shaft 17 by means of the chain 38 is preferably synchronized so that the partition members 18 will deliver cakes to the flipper bars 19 only when the latter are in position to receive them. This makes it unnecessary for the operator to give attention to the timing of his loading of the conveyor 14.

It is believed that the operation can be readily understood from the above. Briefly, the cakes are dumped onto the bar conveyor 14 and arranged in rows upside down between the partition members 18, they then slide upon the flipper bars 19. These bars immediately swing over to place the cakes rightside up on the bars 21 then immediately return to receive the next row of cakes. The bars 21 then flip over and drop the row of cakes upside down in the icing in the pan 24 and return to receive the next row of cakes. The bars 23 pick the upside down cakes from the icing and deposit them rightside up on the belt 26. The bars 19 and 23 move simultaneously. The bars 21 move intermediate the movement of the first bars. Stop rods 49 may be placed across the various sets of flipper bars to stop and align the oncoming cakes. These stop bars are mounted on sliding sleeves 50, which can be set in any desired position along the flipper rods by means of suitable set screws 51.

While a specific form of the improvement has been described and illustrated herein, it is desired to be understood that the same may be varied, within the scope of the appended claims, without departing from the spirit of the invention.

Having thus described the invention, what is claimed and desired secured by Letters Patent is:

1. A machine for icing cakes in an icing pan containing semi-fluid icing, comprising: a first flipper shaft positioned above one side of said pan; a first set of flipper bars extending from said shaft to a substantially horizontal position below the surface of said icing; a second flipper shaft positioned above the opposite side of said pan; a second set of flipper bars extending from said second flipper shaft to a substantially horizontal position over said icing to place the cakes therein above the first flipper bars; means for rotating the second flipper shaft substantially 180° to swing the second set of bars out of the path of the first set of bars; means for subsequently rotating the first flipper shaft substantially 180° to lift the cakes from the icing and invert them to one side of said pan; a third flipper shaft positioned parallel to the second flipper shaft; a third set of flipper bars extending from said third shaft to a substantially horizontal position over the second set of flipper bars to place the cakes on the latter in an upright position; and means for swinging said third shaft similarly to and in unison with said first flipper shaft.

2. A machine for icing cakes in an icing pan containing semi-fluid icing, comprising: a first flipper shaft positioned above one side of said pan; a first set of flipper bars extending from said shaft to a substantially horizontal position below the surface of said icing; a second flipper shaft positioned above the opposite side of said pan; a second set of flipper bars extending from said second flipper shaft to a substantially horizontal position over said icing to place the cakes therein above the first flipper bars; means for rotating the second flipper shaft substantially 180° to swing the second set of bars out of the path of the first set of bars; means for subsequently rotating the first flipper shaft substantially 180° to lift the cakes from the icing and invert them to one side of said pan; a third flipper shaft positioned parallel to the second flipper shaft; a third set of flipper bars extending from said third shaft to a substantially horizontal position over the second set of flipper bars to place the cakes on the latter in an upright position; means for swinging said third shaft similarly to and in unison with said first flipper shaft; and means for placing the cakes on the third set of flipper bars in an inverted position.

3. A machine for placing bakery products in a pan of icing with their top sides down, and removing the products from the icing with their top sides up, comprising: a first flipper member positioned to receive the products top side down and adapted to rotate through an arc of 180° to place the products top side up; a second flipper member positioned to receive the top-side-up products from the first flipper member and adapted to rotate through an arc of 180° to place the products in the pan of icing top side down; a third flipper member positioned to receive the top-side-down products in the icing and adapted to rotate through an arc of 180° to remove the products from the icing and place them top side up; a lever connected with each flipper member for rotating the latter; a connecting rod connecting the levers of the first and third flipper members so that they will move in unison; and means for alternately moving said connecting rod and the lever of the second flipper member through an arc of 180°.

4. A machine for placing bakery products in a pan of icing with their top sides down, and removing the products from the icing with their top sides up, comprising: a first flipper member positioned to receive the products top side down and adapted to rotate through an arc of 180° to place the products top side up; a second flipper member positioned to receive the top-side-up products from the first flipper member and adapted to rotate through an arc of 180° to place the products in the pan of icing top side down; a third flipper member positioned to receive the top-side-down products in the icing and adapted to rotate through an arc of 180° to remove the products from the icing and place them top side up; a lever connected with each flipper member for rotating the latter; a connecting rod connecting the levers of the first and third flipper members so that they will move in unison; a rotating cam; a cam follower on each side of said cam positioned to be alternately actuated by said cam; a first connecting means connecting one of said followers with said connecting rod; and a second connecting means connecting the other follower with the lever on said second flipper so as to alternately rotate said first and third flippers and said second flipper through an arc of 180° and then return them to their original product-receiving positions.

ALLEN L. SPONG.

(References on following page)

REFERENCES CITED

The following references are of record in the file of this patent:

UNITED STATES PATENTS

| Number | Name | Date |
|---|---|---|
| 704,248 | Goldschmidt | July 8, 1902 |
| 791,363 | Pecher | May 30, 1905 |
| 1,255,624 | Miracky | Feb. 5, 1918 |
| 1,461,488 | Lisi | July 10, 1923 |
| 1,716,080 | Padilla | June 4, 1929 |
| 1,916,838 | Hiatt | July 4, 1933 |